(12) United States Patent
Kelley et al.

(10) Patent No.: US 6,268,077 B1
(45) Date of Patent: Jul. 31, 2001

(54) PORTABLE FUEL CELL POWER SUPPLY

(75) Inventors: Ronald J. Kelley, Coral Springs; Steven D. Pratt, Plantation; Bobby Dean Landreth, Fort Lauderdale; Robert W. Pennisi, Boca Raton; Sivakumar Muthuswamy, Plantation; Glenn F. Urbish, Coral Springs, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/260,097

(22) Filed: Mar. 1, 1999

(51) Int. Cl.$^7$ ...................................................... H01M 8/10
(52) U.S. Cl. .................. 429/33; 429/30; 429/34
(58) Field of Search .................. 429/33, 22, 30, 429/34

(56) References Cited

U.S. PATENT DOCUMENTS

| | | | |
|---|---|---|---|
| 5,514,486 | * 5/1996 | Wilson | 429/30 |
| 5,595,834 | * 1/1997 | Wilson et al. | 429/30 |
| 5,759,712 | * 6/1998 | Hockaday | 429/30 |
| 5,962,155 | * 10/1999 | Kuranaka et al. | 429/33 X |
| 5,976,725 | * 11/1999 | Gamo et al. | 429/33 X |
| 6,057,051 | * 5/2000 | Uchida et al. | 429/30 X |
| 6,194,092 | * 2/2001 | Ohara et al. | 429/22 X |

* cited by examiner

Primary Examiner—John S. Maples
(74) Attorney, Agent, or Firm—Dale W. Dorinski

(57) ABSTRACT

The invention provides a device for generating energy, utilizing a fuel cell. Air is freely guided to the fuel cell, while a fuel gas is provided to the fuel cell from a pressurized fuel supply via a regulator. The portable power supply is most applicable to use with handheld electric devices, and contains a fuel storage means (110) for storing a supply of fuel, a fuel delivery means (120) connected to the fuel storage means, an energy conversion device (140) connected to the fuel delivery means for converting the fuel to electricity. The fuel storage means, the fuel delivery means, and the energy conversion device are all contained in a volume less than 500 cubic centimeters.

22 Claims, 4 Drawing Sheets

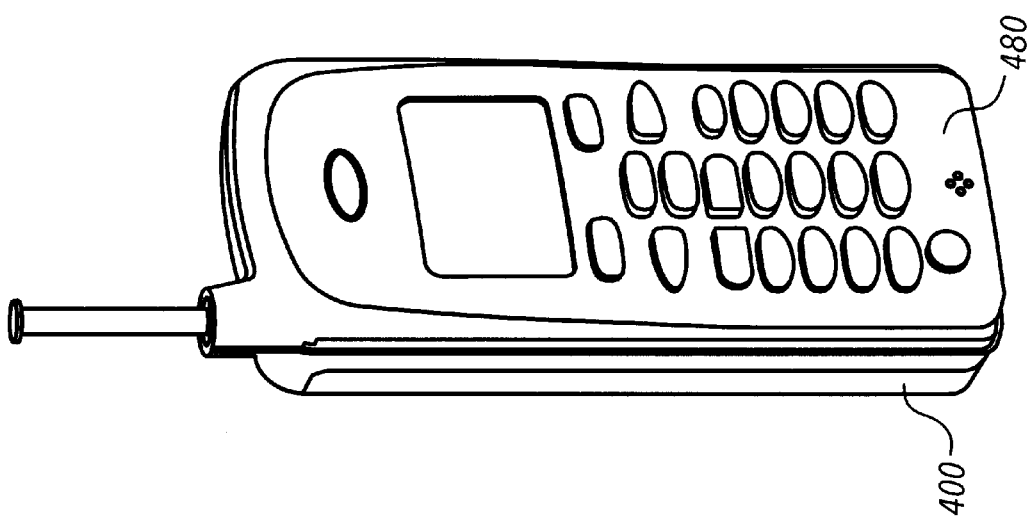

PORTABLE FUEL CELL POWER SUPPLY

CROSS REFERENCE TO RELATED APPLICATIONS

This application is related to U.S. Pat. No. 6,127,058, by Pratt et. al., entitled "Planar Fuel Cell," and assigned to Motorola, Inc.

TECHNICAL FIELD

This invention relates in general to devices that deliver electric power to handheld electrical devices, and more specifically, to a portable power supply utilizing a fuel cell to convert a fuel to electricity.

BACKGROUND

In fuel cells, electrical energy is produced by reacting a fuel with an oxidant in the presence of a catalyst. A typical fuel cell consists of a fuel electrode (anode) and an oxidant electrode (cathode), separated by an ion-conducting electrolyte. The electrodes are connected to a load (such as an electronic circuit) by an external circuit conductor. In the circuit conductor, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. At the anode, incoming hydrogen gas ionizes to produce hydrogen ions and electrons. Since the electrolyte is not an electronic conductor, the electrons flow away from the anode via the external circuit. At the cathode, oxygen gas reacts with the hydrogen ions migrating through the electrolyte and the incoming electrons from the external circuit to produce water as a byproduct, which is then typically extracted as a vapor. One well-known type of fuel cell includes a "membrane-electrode assembly" (MEA) which is typically a thin, proton-transmissive, solid polymer membrane electrolyte having an anode on one of its faces and a cathode on the opposite face. The MEA is sandwiched between a pair of electrically conductive elements which serve as current collectors for the anode and cathode, and contain appropriate channels and/or openings therein for distributing the fuel cell's gaseous reactants over the surfaces of the respective anode and cathode catalysts. One such MEA and fuel cell is described in U.S. Pat. No. 5,272,017. In practice, a number of these unit fuel cells are normally stacked or 'ganged' together to form a fuel cell stack or assembly. The individual cells are electrically connected in series by abutting the anode current collector of one cell with the cathode current collector of its nearest neighbor in the stack.

For portable electrical equipment requiring up to about 100 Watts of electrical power, batteries have been the only choice. From toys to laptop computers, batteries provide power for a limited amount of time and then have to be either recharged or replaced. In theory, fuel cells have the same consumer friendly general properties as batteries—giving quiet electrochemical power and can also be 'recharged' chemically although not by electrical means. However, the real advantage of fuel cells lies in their long lifetime and their use of liquid or gas rather than the solid 'fuels' used in conventional batteries. The efforts of the prior art have essentially been focused on improvements in fuel cell stacks, and much of this effort has resulted in smaller stacks that were created by miniaturizing many of the mechanical parts in the stack. However, even the smallest stacks are still prohibitively large for use with handheld portable electrical equipment, such as two-way radios, cellular telephones, laptop computers, and cordless power tools, to name but a few. Little, if any effort has been expended to reduce the size of the various other components required to support a fuel cell, namely the fuel storage, the interconnections (hoses, clamps, etc.) and the regulators. Thus, even the smallest, state-of-the-art devices are still as large as a shoe box. It would be a significant addition to society if a truly small portable power supply could be created, using fuel cell technology, to unlock the true potential of portable electric devices. For example, even the best electrochemical batteries can only power a laptop computer or a cellular telephone for, at most, one day, whereas 30 days would be a much more useful capacity.

BRIEF DESCRIPTION OF THE DRAWINGS

FIG. 4 is a radio powered by a portable power supply in accordance with the invention.

DETAILED DESCRIPTION OF THE PREFERRED EMBODIMENT

A portable power supply for handheld electric devices contains a fuel storage means for storing a supply of fuel, a fuel delivery means connected to the fuel storage means, and an energy conversion device connected to the fuel delivery means for converting the fuel to electricity. The fuel storage means, the fuel delivery means, and the energy conversion device are all contained in a total volume less than 1000 cubic centimeters, and more preferably, within a volume less than 500 cubic centimeters. The portable power supply further contains means for electrically and mechanically interconnecting with a portable radio or other electrical device.

Figure 1:
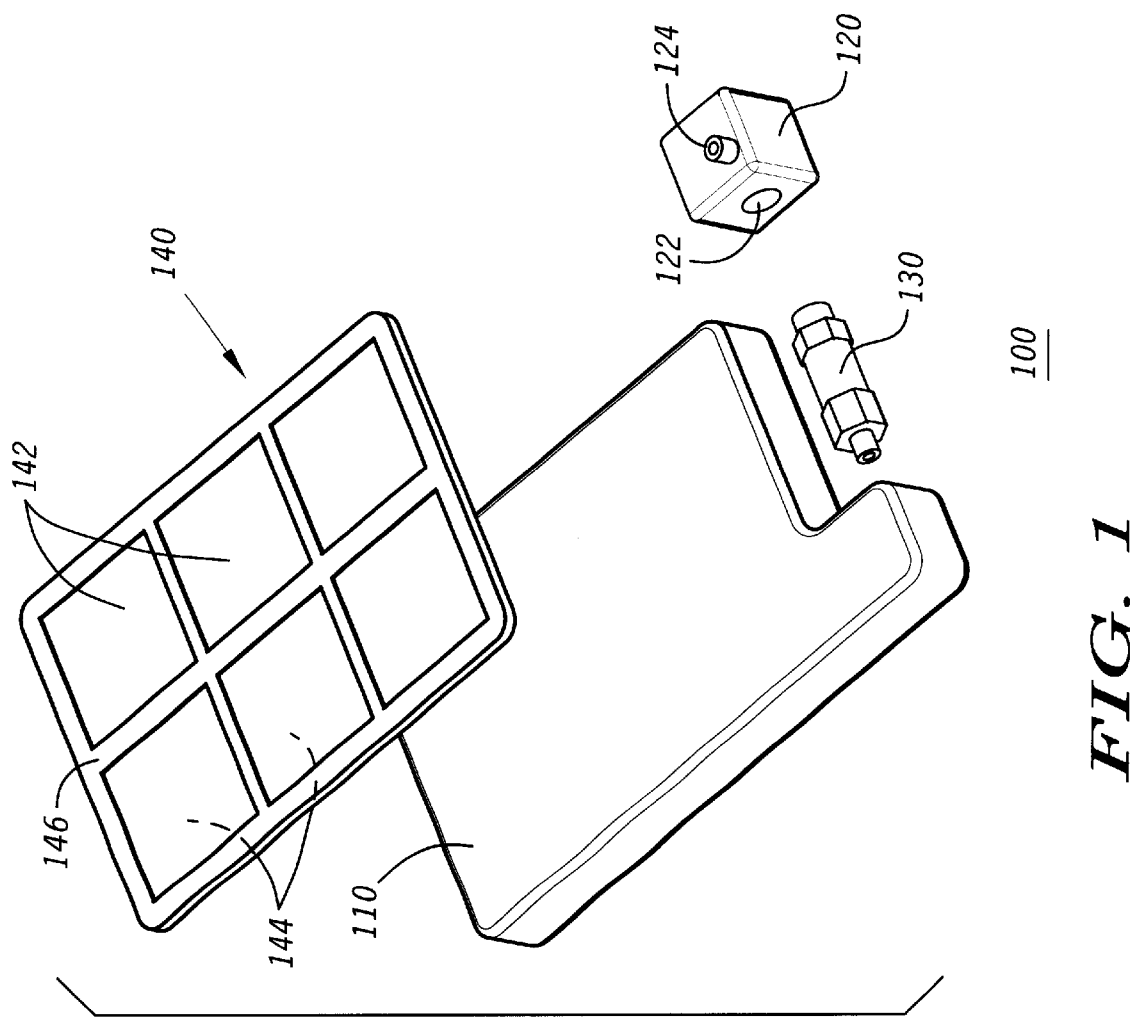
FIG. 1 is an exploded isometric view of a portable power supply in accordance with a preferred embodiment of the invention.

While the specification concludes with claims defining the features of the invention that are regarded as novel, it is believed that the construction, method of operation and advantages of the invention will be better understood from a consideration of the following description in conjunction with the drawing figures. Referring now to FIG. 1, the portable power supply 100 consists of a fuel storage means 110 for containing a supply of fuel. The fuel storage means 110 can also be referred to as a fuel tank, fuel canister, fuel storage system or fuel storage unit. In our preferred embodiment, the fuel storage means 110 is a metal container designed to hold a supply of pressurized hydrogen or, alternatively, a quantity of a hydrogen-containing chemical compound that liberates hydrogen gas under appropriate conditions. Hydrogen can be stored in metals as metallic hydrides and there are a range of metals and alloys that can be used, the most well-known being Palladium, but other, less expensive alloys of non-noble metals are also suitable. For example, an alloy of La and Ni can reversibly absorb about 1.4% of its weight as hydrogen (to form $LaNi_5H_6$). Alloys of the more commonly available metals also absorb hydrogen to make, for example, $FeTiH_2$. Several multicomponent alloys have been developed to improve the kinetics of hydrogen removal and uptake to adjust for the applications as required. For fuel cells the requirement is that this should be reasonably fast at ambient temperatures and pressures. At present, metal hydrides are readily available and are used as an electrochemical fuel in rechargeable batteries where they serve as a nontoxic replacement for cadmium in the familiar NiCd battery. Lighter hydrides such as LiH, LiAlH$_4$, NaBH$_4$ etc. release hydrogen on contact with water. Liquid organic hydrides such as decalin (C$_{10}$H$_{18}$) or methylcyclohexane (C$_6$H$_{11}$CH$_3$) may also be used.

Another hydrocarbon that can be used to store hydrogen in the fuel supply tank is methanol. Methanol is converted to hydrogen via a 'reformation' reaction:

Another form of hydrogen storage is carbon-graphite nanofibers (J. Phys. Chem. Vol. 102, 1998) that can absorb more than 20 liters of hydrogen and deliver over 10 liters of hydrogen per gram of graphite.

Clearly, numerous materials can be stored in the fuel storage means 100 as long as it is sufficient to provide a reasonable supply of hydrogen gas. The fuel storage means generally needs to be pressurized in order to provide a sufficient quantity of hydrogen for practical use, so a regulator or fuel delivery means 120 is used to regulate the flow of gas and to reduce the pressure. In our preferred embodiment, the fuel delivery means is a device that controls the flow and/or pressure of a gas, such as a mechanical micro pressure regulator that is designed to operate with an output pressure less than ten pounds per square inch. Alternatively, the fuel delivery means is a micro-machined regulator made from a silicon chip. Micro-machined regulators require a separate control circuit to operate, along with a low voltage source of electric power. While this control circuitry is not shown in the drawing figures, one skilled in the art will appreciate that such a circuit is not complex, and is easily rendered quite small by use of conventional high resolution printed circuit board technology.

A micro-machined regulator and the accompanying control circuitry consumes less volume than a mechanical micro pressure regulator. The fuel delivery means 120 can be directly coupled to the fuel storage means 110, or it can be optionally coupled to it by a miniature quick disconnect 130. This allows for quick and easy removal of the fuel tank when it is empty, and also allows the user to easily reconnect a new fuel tank. Depending on the design, the fuel tank can be disposable or refillable.

Further, the control circuitry described above can also include control circuitry that is useful for starting the fuel cell from a dormant state, for monitoring and adjusting the operation of the fuel cell (e.g. for water management, purging, load leveling, etc.), and for emergency shutdown. In some situations, a small power source is included with the portable power supply device, such as a button cell battery, a capacitor, or a super capacitor. This small power source is used to provide energy to the control circuitry to start the fuel cell up from a dormant state.

The input side 122 of the regulator receives the high pressure hydrogen from the fuel storage means 110, and the output side 124 provides hydrogen at a low pressure. The output side 124 is connected to an energy conversion device 140. In our preferred embodiment, the energy conversion device 140 is a planar fuel cell that is designed to be air breathing. That is, ambient air is used as the source of oxygen, thus eliminating the need for a supply of compressed oxygen or air. An air breathing fuel cell utilizes the oxygen in the ambient air as the source of oxidant, as opposed to using pressurized air or oxygen as in conventional stacked fuel cells.

A planar fuel cell is created by sandwiching a membrane electrode assembly (MEA) between two current collector assemblies. The MEA is a single sheet of a polymer electrolyte membrane (PEM) with an array of cathodes 142 on one side and an array of corresponding anodes 144 on the other side. Current collectors are supported by a plastic frame 146, and they have an interconnect tab that provides an electrical pathway beyond the perimeter of the MEA. The interconnect tabs are situated to provide electron transfer between the anodes and the cathodes such that the interconnect tab does not traverse the thickness of the polymer electrolyte membrane. When the planar fuel cell is assembled, the interconnect tab is sealed to prevent leaking of fuel gas. Fuel is supplied to only one side of the membrane electrode assembly and oxidant is supplied only to the other side. In PEM-based fuel cells, the proton exchange membrane is coated on both sides with a catalyst (platinum or palladium) to form an electrode. This assembly is called a membrane electrode assembly (MEA). As used in the context of this discussion and elsewhere in the literature, either side of the MEA can serve as the anode or cathode. In the strictest sense, it is hydrogen that is the anode material (fuel) and oxygen is the cathode material (oxidizer). However, practically speaking, whichever electrode of the MEA is exposed to hydrogen is accordingly referred to as the anode. Conversely, the oxygen side electrode is called the cathode. Electrodes of the MEA have several functions. They must: 1) diffuse oxygen and hydrogen evenly across the surface, 2) allow water molecules to escape (principally a cathode-side issue), 3) hold back a small amount water to keep the membrane wet and efficient (cathode side issue only), 4) catalyze the reactions, 5) conduct electrons so they can be collected and routed through an electrical circuit, and 6) conduct protons a very short distance to the proton exchange membrane. To accomplish these disparate needs, MEAs typically consist of several layers of various forms of carbon and polymers in addition to the catalyst. Both the water management and the electron conduction functions are satisfied with dual role diffusion layers which are sandwiched over the catalyst layers. These diffusion layers are usually comprised of woven carbon fiber cloth or porous carbon paper. In practice, the diffusion layer can be integral to the electrodes, integral to the current collectors, or a separate piece sandwiched between the current collector and the electrode. In our preferred embodiment, the diffusion layer is incorporated in the electrodes, but it can also be part of the current collector or a separate piece. For simplicity, we assume that the diffusion layer does not restrict the relative proximity of the current collector and the electrode. A unit cell is formed by the combination of a PEM, an anode, a cathode, and two associated current collectors. There are six unit cells in the drawings, and each of the unit cells is isolated from its neighbors by a wall in the frame. Thus, the depicted planar fuel cell is the electrical equivalent of a six-high conventional fuel cell stack, eliminating many of the seals, gas piping, and electrical interconnections.

One example of a composite membrane for use as a PEM may be found in U.S. Pat. No. 5,635,041; 5,547,551; and 5,599,614 which are incorporated herein by reference. The composite membrane includes a base material and an ion exchange material or ion exchange resin. The base material is typically an expanded polytetrafluoroethylene membrane which is defined by a porous microstructure characterized by nodes interconnected by fibrils, or a porous microstructure characterized substantially by fibrils. The ion exchange resin substantially impregnates the membrane so as to render the interior volume substantially occlusive. The ion exchange resin is securely adhered to both the external and internal membrane surfaces, i.e. the fibrils and/or nodes of the base material. One PEM that we find particularly suitable is manufactured by W. L. Gore and Associates under the tradename of GORE-SELECT.

Figure 2:
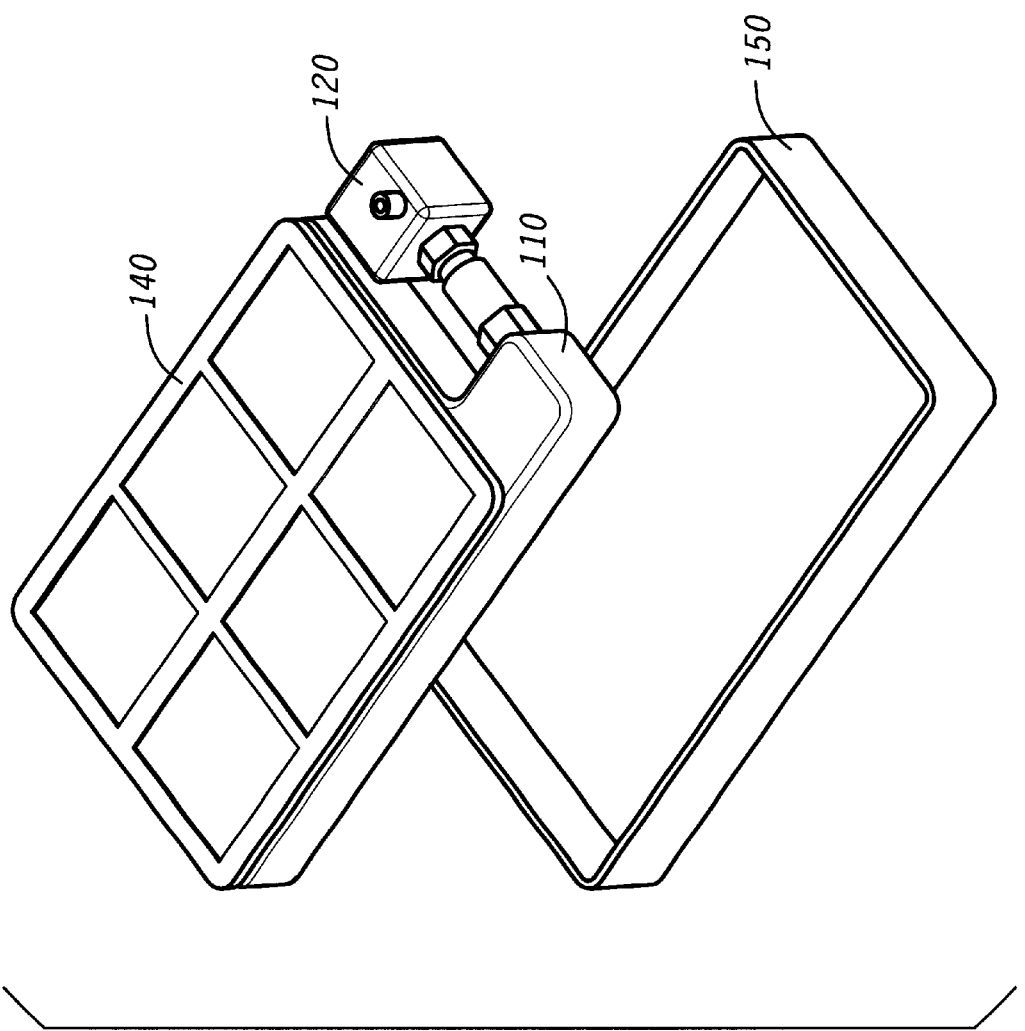
FIG. 2 is a partially assembled view of the device shown in FIG. 1.

Referring now to FIG. 2, the fuel storage means 110, the fuel delivery means 120 and the energy conversion device 140 are all preferably contained in a housing 150. This provides ease of packaging and optimum use by the consumer. An alternate embodiment of the invention is shown in exploded view in FIG. 3, wherein three energy conversion devices 340 are interconnected to the fuel delivery means 320 and the fuel storage means 310. All components are contained in a two piece housing 350, 355. Since the energy conversion device (fuel cell) is air breathing, the arrangement of the various components must be such that one portion (the cathode side) of the fuel cell is exposed to ambient air. This can be accomplished by, for example, designing a portion of the housing 350 so that there are vents or openings 357 that expose the cathode side of the fuel cell to air. In addition, a means for mechanical attachment 360 to the handheld portable device can be included, such as a latch, for example, along with appropriate electrical connections 370 between the energy conversion device 340 and the portable device (not shown). The housing serves to provide a convenient, captive means to package the various components of our portable power supply, so that it can be easily used with a wide variety of handheld portable electric devices, such as cellular telephones, two-way radios, laptop computers, cordless drills, camcorders, cordless saws, cordless battery chargers, portable televisions, etc.

By employing a unique combination of elements, we have created a portable power supply that is smaller than any previously known in the art. All conventional systems focused on one of the components in a power supply, namely the fuel cell or the fuel storage system, but none have optimized all of the components to capture the synergy that is created when a truly small system is designed. Our invention provides the smallest portable power supply using a fuel cell, and the use of fuel cell technology allows our invention to deliver a much larger amount of power in a much smaller package than has ever been realized with electrochemical means. Illustrative examples that demonstrates our invention will now be shown.

The portable power supply depicted in FIGS. 1 and 2 is approximately 5 centimeters wide, 8.5 centimeters tall and 1.3 centimeters thick, for a total volume of approximately 55 $cm^3$. Each cell in the fuel cell array delivers 0.6 volts, for a total system voltage of 3.6 volts. Each fuel cell delivers approximately 500 $mA/cm^2$, or a total of 2000 mA for the array. This device then provides approximately 7.2 watts. When appropriately filled, the fuel canister contains approximately 0.038 liters of gaseous hydrogen. Benchmark studies of hydrogen storage published in "Workshop on Hydrogen Storage and Generation for Medium Power and Energy Applications," Apr. 8–10, 1997, Orlando, US Army Research Office Report indicate that hydrogen storage in a low temperature metal hydride is 1800 Watt-hours/liter. Thus, the portable power supply depicted in FIGS. 1 and 2 is capable of delivering 68.4 Watt-hours, which is equivalent to 19,000 milliamp-hours at 3.6 volts.

Figure 3:
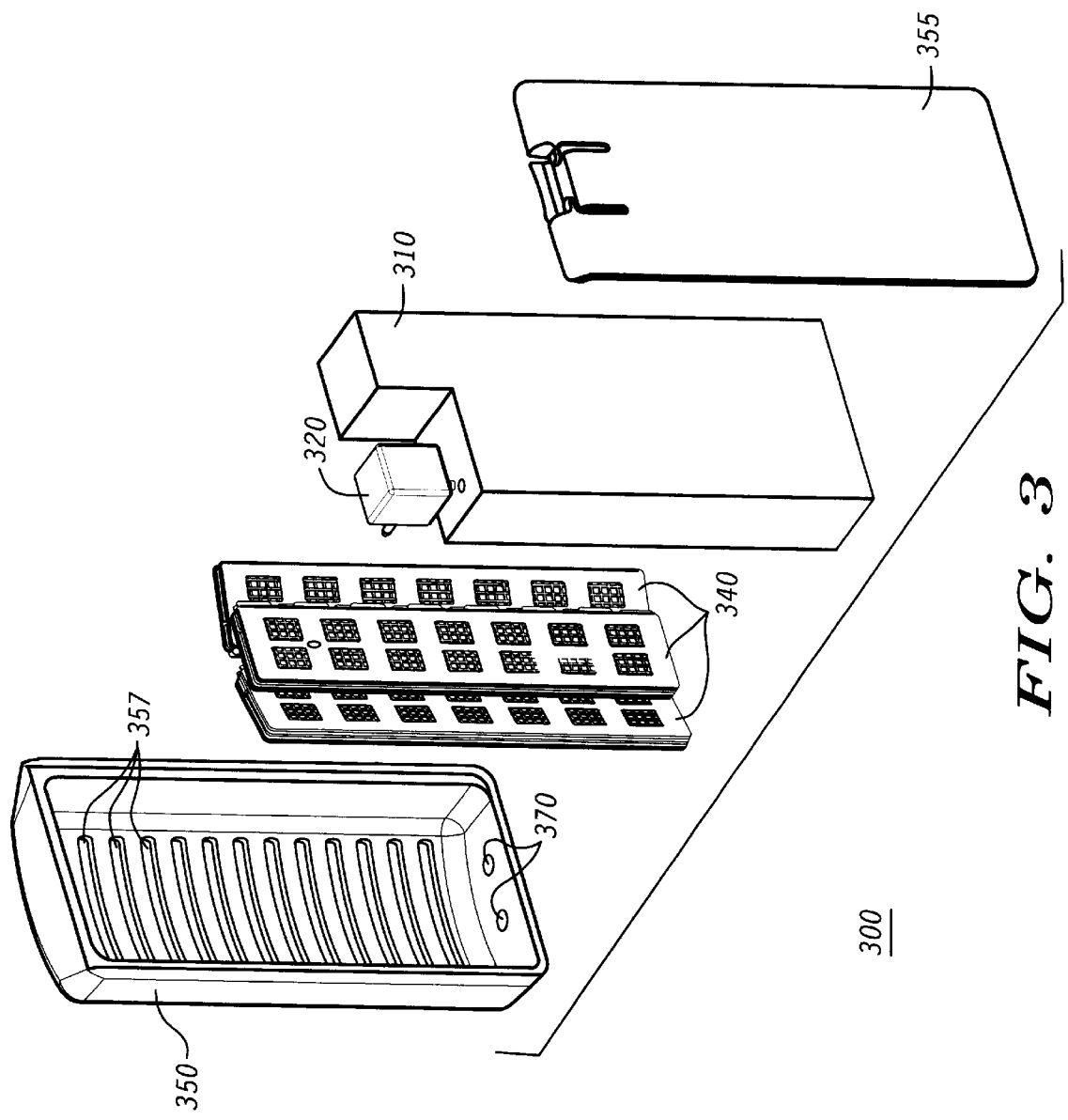
FIG. 3 is an exploded isometric view of a portable power supply in accordance with an alternate embodiment of the invention.

A larger version of this fuel cell can also be realized by increasing the size of the fuel storage means and the energy conversion device. The portable power supply depicted in FIG. 3 is approximately 6 centimeters wide, 12.3 centimeters tall and 2.6 centimeters thick, for a total volume of approximately 192 $cm^3$. The smallest of the known prior art fuel cell systems is approximately the size of a shoe box.

The previous two examples will find particular use with handheld two-way portable radios and cellular telephones. (A reader skilled in the art will appreciate that a cellular telephone is simply a low powered two-way radio, but since consumers do not normally think of a cellular or cordless telephone as being a radio, they are mentioned here separately.) By replacing the battery of such devices with our invention, the standby time can be increased from 2–10 times, along with a commensurate increase in talk (transmit) time. In contrast to all previous prior art devices, our invention can be a direct replacement for conventional batteries, with a substantial increase in energy storage, and no increase in size. FIG. 4 shows how a radio 480 can be powered by a portable power supply 400 similar in configuration to that shown in FIG. 3. When our invention is scaled up to greater than 1000 $cm^3$, the use with handheld two-way radios becomes questionable. However, below this level, it is substantially smaller than any known prior art system. Thus, portable power supplies less than 1000 $cm^3$ are new, novel and useful, especially those less than 500 $cm^3$, and even more so for those around 50 $cm^3$. While the examples shown demonstrate very small portable power supplies, it is clear that the scope and spirit of our invention covers portable power supplies in the range from 1000 $cm^3$ down to less than 50 $cm^3$.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A portable power supply, comprising:
   a fuel storage means for storing a supply of hydrogen fuel occluded as a metal hydride or in graphite nanofibers;
   a fuel delivery means, connected to the fuel storage means;
   an air breathing planar fuel cell having a cathode side exposed to ambient air and connected to the fuel delivery means, for converting the fuel to electricity; and
   wherein the fuel storage means, the fuel delivery means, and the air breathing planar fuel cell are all contained in a volume less than 100 cubic centimeters and the portable power supply delivers at least one watt of power.

2. The portable power supply as described in claim 1, further comprising a housing for containing the fuel storage means, the fuel delivery means, and the air breathing planar fuel cell.

3. A device for generating energy, comprising:
   a passive air breathing planar fuel cell having a cathode exposed to air;
   a fuel storage unit for containing a supply of hydrogen fuel occluded as a metal hydride or in graphite nanofibers;
   a regulating means disposed between and connected to the fuel cell and to the fuel storage unit, to regulate the amount of fuel emanating from the fuel storage unit into the fuel cell; and
   a housing having an internal volume no greater than 1000 cubic centimeters, for containing the fuel cell and the fuel storage unit and the regulating means therein.

4. The device for generating electricity as described in claim 3, wherein the internal volume of the housing is less than 500 cubic centimeters.

5. A device for generating electricity, comprising:
   a planar fuel cell for electricity generation by catalytic combustion of gaseous hydrogen fuel with oxygen gas from ambient air, said fuel cell comprising an anode, a cathode, and a solid polymer electrolyte disposed between the anode and the cathode;
   a fuel tank for containing a supply of hydrogen fuel occluded as a metal hydride or in graphite nanofibers;
   a fuel delivery means disposed between and connected to the fuel tank and to the fuel supply, to regulate and deliver a sufficient amount of fuel from the fuel tank into the fuel cell; and
   the combined volume of the fuel cell and the fuel tank and the fuel delivery means is no greater than 1000 cubic centimeters.

6. The device for generating electricity as described in claim 5, wherein the fuel delivery means is a pressure or flow controlling device.

7. The device for generating electricity as described in claim 6, wherein the fuel delivery means is a micromachined pressure or flow controlling device.

8. The device for generating electricity as described in claim 5, further comprising control electronics for altering the operation of the device.

9. The device for generating electricity as described in claim 5, wherein the fuel tank contains a hydrogen-containing chemical compound that liberates hydrogen gas.

10. The device for generating electricity as described in claim 5, wherein the fuel cell has a polymer electrode membrane.

11. The device for generating electricity as described in claim 5, wherein the fuel cell is an air breathing fuel cell.

12. The device for generating electricity as described in claim 5, wherein one portion of the housing is arranged to allow the fuel cell cathode to be exposed to ambient air to passively supply air to the cathode.

13. The device for generating electricity as described in claim 5, wherein the internal volume of the housing is less than 100 cubic centimeters.

14. The device for generating electricity as described in claim 5, further comprising attachment means for mechanically attaching said device to a radio, and interconnection means for electrically connecting said device to said radio.

15. A device for generating electricity, comprising:
   a planar fuel cell for electricity generation by catalytic combustion of gaseous hydrogen fuel with oxygen gas from ambient air, said fuel cell comprising an anode, a cathode, and a solid polymer electrolyte disposed between the anode and the cathode;
   a fuel tank for containing a supply of hydrogen fuel occluded as a metal hydride or in graphite nanofibers;
   a fuel delivery means disposed between and connected to the fuel tank and to the fuel supply, to regulate and deliver a sufficient amount of fuel from the fuel tank into the fuel cell;
   a power supply for use in starting the device; and
   the combined volume of the fuel cell and the fuel tank and the fuel delivery means is no greater than 1000 cubic centimeters.

16. The device for generating electricity as described in claim 15, wherein the power supply is a battery, a capacitor, or a super capacitor.

17. A portable fuel cell power supply for use with handheld devices, comprising:
   a hydride storage canister for storing a supply of hydrogen as a metal hydride;
   a fuel delivery means, connected to the hydride storage canister;
   an air breathing planar fuel cell having a polymer electrolyte membrane, connected to the fuel delivery means, for converting the hydrogen to electricity;
   wherein the combined volume of the hydride storage canister, the fuel delivery means, and the air breathing planar fuel cell is less than 500 cubic centimeters; and
   wherein the portable power supply provides at least eighty watts of electric power.

18. The portable fuel cell power supply as described in claim 17, further comprising a housing for containing the hydrogen storage canister, the fuel delivery means, and the air breathing planar fuel cell.

19. The portable fuel cell power supply as described in claim 18, wherein one portion of the housing is arranged to allow the fuel cell to be exposed to air.

20. A portable power supply for use with handheld devices comprises an air breathing planar fuel cell disposed in a housing such that a cathode side of the fuel cell is exposed to ambient air, a hydrogen storage means to store hydrogen occluded as a metal hydride or in graphite nanofibers disposed in the housing, a fuel delivery means connecting the hydrogen storage means to the fuel cell, and wherein the internal volume of the housing does not exceed 500 cubic centimeters.

21. The portable power supply as described in claim 20, wherein the volume of the air breathing planar fuel cell is less than twenty percent of the internal volume of the housing.

22. The portable power supply as described in claim 20, further comprising:
   attachment means for mechanically attaching said portable power supply to a radio; and
   interconnection means for electrically connecting said portable power supply to said radio.

* * * * *